US005710816A

United States Patent [19]

Stork et al.

[11] Patent Number: 5,710,816

[45] Date of Patent: Jan. 20, 1998

[54] METHOD AND APPARATUS FOR ENSURING RECEIPT OF VOICEMAIL MESSAGES

[75] Inventors: David G. Stork; Nancy P. Stork, both of Stanford, Calif.

[73] Assignees: Ricoh Corporation, Menlo Park, Calif.; Ricoh Company, Ltd., Tokyo, Japan

[21] Appl. No.: 439,364

[22] Filed: May 11, 1995

[51] Int. Cl.$^{6}$ .................................. H04L 9/00; H04L 9/08

[52] U.S. Cl. .................................. 380/21; 380/4; 380/9; 380/23; 380/25; 380/49; 379/67; 379/68; 379/88

[58] Field of Search .............................. 380/4, 9, 21, 23, 380/25, 49, 50; 379/67, 68, 88, 89

[56] References Cited

U.S. PATENT DOCUMENTS

| | | | |
|---|---|---|---|
| 4,182,933 | 1/1980 | Rosenblum | 380/21 |
| 5,115,466 | 5/1992 | Presttun | 380/9 |
| 5,136,648 | 8/1992 | Olson | 380/50 |

*Primary Examiner*—Bernarr E. Gregory
*Attorney, Agent, or Firm*—Blakely, Sokoloff, Taylor & Zafman

[57] ABSTRACT

A messaging system in which a sender is able to receive certification of receipt of messages sent to a receiver that ensures that only the desired recipient gains access to the messages. Also, the messaging system sends between a sender and a receiver both encrypted communications and decryption information used to decipher the encrypted communications.

31 Claims, 3 Drawing Sheets

METHOD AND APPARATUS FOR ENSURING RECEIPT OF VOICEMAIL MESSAGES

FIELD OF THE INVENTION

The present invention relates to the field of telephone messaging systems; more particularly, this invention relates to certifying that a recipient receives stored telephone messages originally sent by an individual.

BACKGROUND OF THE INVENTION

Today, telephone messaging systems are widely used. Messages typically may be left for an individual (i.e., the receiver) when the individual cannot currently answer the telephone due to any number of reasons, including that the individual is not present or that the individual is currently on another phone call. These messaging capabilities are often referred to as voicemail messaging systems.

For an individual to gain access to their messages, typically a button must be pressed or a code sequence entered upon which the messages are played back. Any person pressing the buttons or entering the proper code may access another user's voicemail messages.

One of the problems with current voicemail systems is that the sender is unable to know or certify that a particular desired receiver has received a message sent by the sender. Current voicemail systems also do not allow the sender to know when a message sent to the receiver was actually received. At the same time, a voicemail sender cannot ensure that only the receiver receives the intended voicemail messages. In other words, a voicemail sender may leave a message knowing it is being recorded by the receiver's machine, yet there is no way that the sender may ensure that only the intended receiver gained access to that voicemail system or to ascertain the time at which the receiver actually received the message.

The present invention provides for certifying that a desired recipient of a telephone message receives the message. Furthermore, the present invention provides for indicating the time at which the receiver obtains messages.

SUMMARY OF THE INVENTION

The present invention provides a method and apparatus for communicating telephone messages. The present invention includes transmitting an encrypted version of a voice signal from a sender to a receiver. The receiver stores the encrypted version of the voice signal as an encrypted voice message. At a later time, the receiver sends a certification request to the sender (or another designated location) in order to obtain information to enable decryption of the encrypted voice message. The receiver then decrypts the encrypted voice message into a voice signal. In this manner, the receiver is able to hear the voice message and the sender is able to certify, through receipt of the certification request, that the intended recipient has received the voice message.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

A method and apparatus for certifying receipt of telephone messages is described. In order to provide a thorough understanding of the present invention, specific details are set forth, such as encryption types, numbers of conductors, etc. However, it will be apparent to one skilled in the art that the present invention may be practiced without these specific details. In other instances, well-known structures and devices are shown in block diagram form, rather than in detail, in order to avoid obscuring the present invention.

Sending Certifiable Telephone Messages

Figure 1:
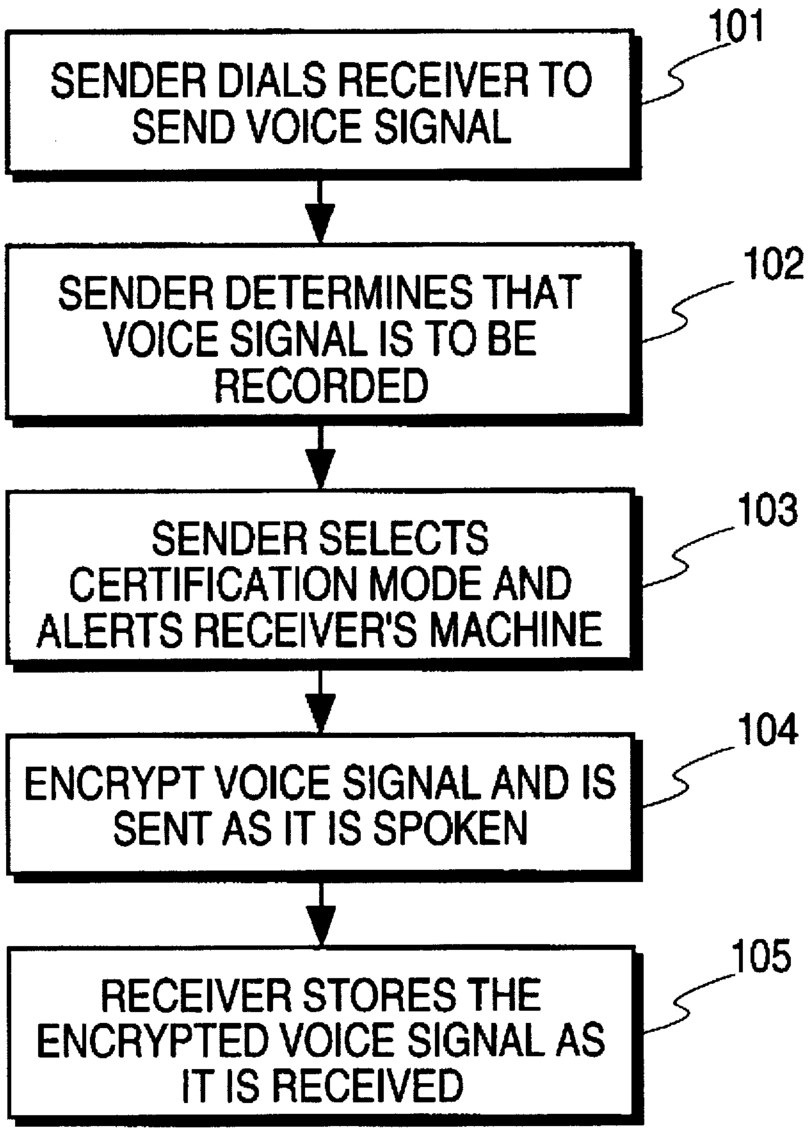
FIG. 1 is a flow diagram of the process for sending a voicemail message according to the present invention.

FIG. 1 illustrates the process of sending a certifiable telephone message according to teachings of the present invention. Referring to FIG. 1, the process begins with the sender dialing the receiver to send a voice signal (processing block 101). The process of dialing in a telephone systems is well-known to those skilled in the art.

The sender then determines that the voice signal is going to be recorded (processing block 102). Typically, the sender is able to identify that the voicemail system of the receiver has been engaged upon hearing the receiver's recorded greeting or prompt that is played after a predetermined time has passed without an answer. In one embodiment, the sender's machine is able to identify for itself that the message is to be recorded. In this case, the sender's machine is responsive to a tone or sound generated by the receiver's voicemail system, such that upon receipt of the tone or sound, the sender's machine is able to identify that the message is to be recorded.

Upon determining that the voice signal is to be recorded, the sender (or sender's machine) selects the certification mode and alerts the receiver to the same (processing block 103). In one embodiment, the sender selects the certification mode by pressing one button or a sequence of buttons on sender's machine. The buttons or sequence of buttons activates the certification mode. Note that switches, keypads, or other signal generating devices may be employed to engage the certification mode.

The receiver's machine is alerted to the fact that the voice message that is to be left will be encrypted. This enables the receiver to prepare for the message, such as by setting one or more bits of memory to indicate that the message stored at that location will be encrypted. This indication also allows the receiver to record the sender's telephone number (or other specified return number) to allow the receiver to later contact the sender (or a location desired by the sender) to obtain information to enable decryption. The identification and recording of the telephone number or a third party number set forth by the sender is well-known in the art. For example, the sender's telephone number may be obtained in the same manner as a facsimile machine obtains a sender's telephone number. Also, the sender may enter their phone number or the number of a third party location as part of the messaging process.

Next, the voice signal is encrypted and sent as it is spoken (processing block 104). In the present invention, any method of encryption may be utilized. In one embodiment, a voice signal is encrypted using a key which may be a permanent key that is unique to the sender or the key could be unique to a particular message.

The encryption could be by Electronic Code Book (ECB) or Cypher Block Chaining (CBC). ECB encrypts the signal block by block. In one embodiment, each block comprises 0.1 seconds of speech. Because the voice message are likely to have multiple blocks of silence, an individual might utilize a non-random statistic of such encoded silences to infer properties of the key. This improves the chances for breaking the code. CBC, by means of feeding back information from previously encoded block, helps avoid the redundancy. For more information on ECB and CBC, see Bruce Schneier, *Applied Cryptography*, Wiley Publishing 1994, pages 137–160.

Upon receipt of the encrypted voice signal, the receiver stores the encrypted voice signal as a message (processing block 105). In one embodiment, the message is stored in a memory with an indication that it is encrypted. The step of storing encrypted voice signal may include storing a return phone number of the sender or a third party used to obtain information to enable decryption at a later time.

The Process for Retrieving Stored Encrypted Voice Messages

Figure 2:
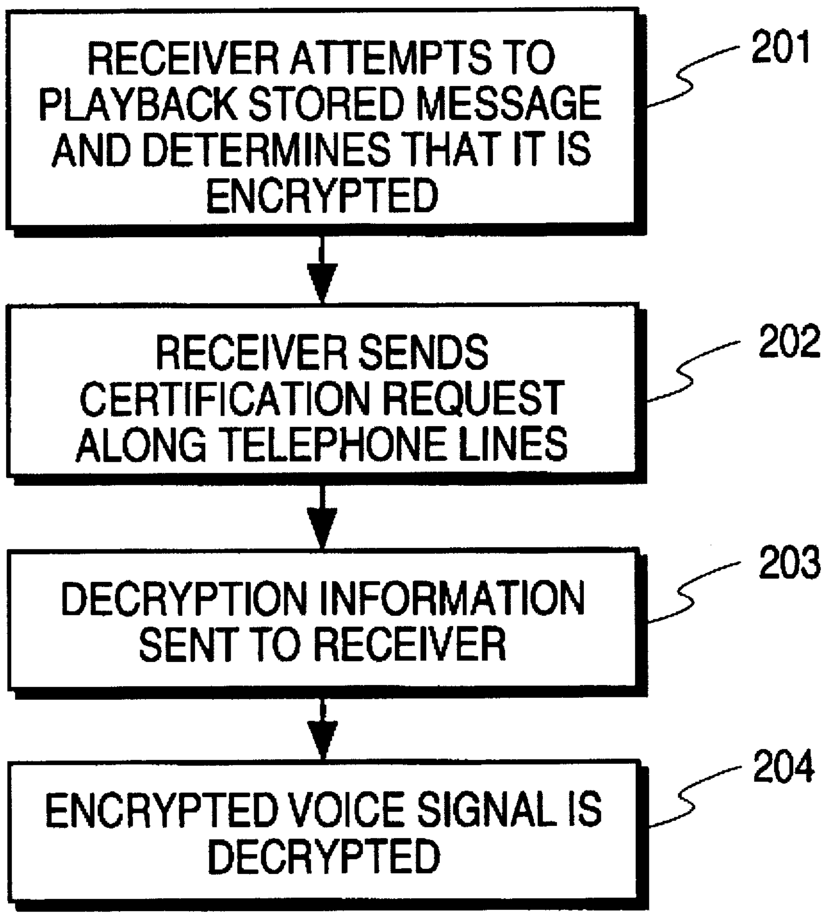
FIG. 2 is a flow diagram of the process for decrypting the encrypted voicemail message stored by the receiver.

FIG. 2 is a flow diagram of the process to retrieve stored encrypted messages. Referring to FIG. 2, the retrieval process begins when the receiver attempts to playback stored messages and determines that they are encrypted (processing block 201). In one embodiment, the retrieval process begins with the access of any message that is stored with an indication that it is encrypted. In another embodiment, the receiver may listen to a message and determine that an inaudible message represents an encrypted message, at which point the receiver sets the receiving machine into a decryption mode.

When performing decryption, the receiver sends a certification request along the telephone lines (processing block 202). The certification request is sent only when an individual enters the correct code or presses the correct sequence of buttons on the receiver. By maintaining the confidentiality of such information, the sender is assured that only the desired individual(s) receives the message(s).

In one embodiment, the certification request comprises a certification signal that is sent to a location specified in the storage area containing the encrypted message. The certification signal is sent to a telephone number stored with the message. The telephone number might represent the telephone number of the sender's machine or may represent a phone number to a third party location. In either case, the location defined by the stored phone number is capable of providing the necessary information to decrypt the message.

The certification request may specify the message that the receiver is attempting to decrypt. By doing so, the sender is able to send the proper decryption information.

Upon receipt of the certification request, the sender's machine (or other third party machine) sends information to enable decryption to the receiver (processing block 203). In one embodiment, the decryption information comprises a key that may be used to decrypt the encrypted message. The key may be unique to the sender or unique to the message. The decryption information may be stored with an indication setting forth the message that is to be decrypted. This ensures that the proper decryption information is sent. The decryption information is sent over telephone lines.

Upon receipt of the decryption information, the encrypted voice signal is decrypted, such that the receiver hears the message. The decryption in the present invention can be performed minutes, hours, days, weeks after the original transmission.

By using a certification request signal in order to obtain the decryption information, the sender is able to certify that the receiver has received the message. Furthermore, simple additional dating software or time stamping software may be used to date the receipt of the certification signal in order to record the time at which the message was decrypted.

Figure 3:
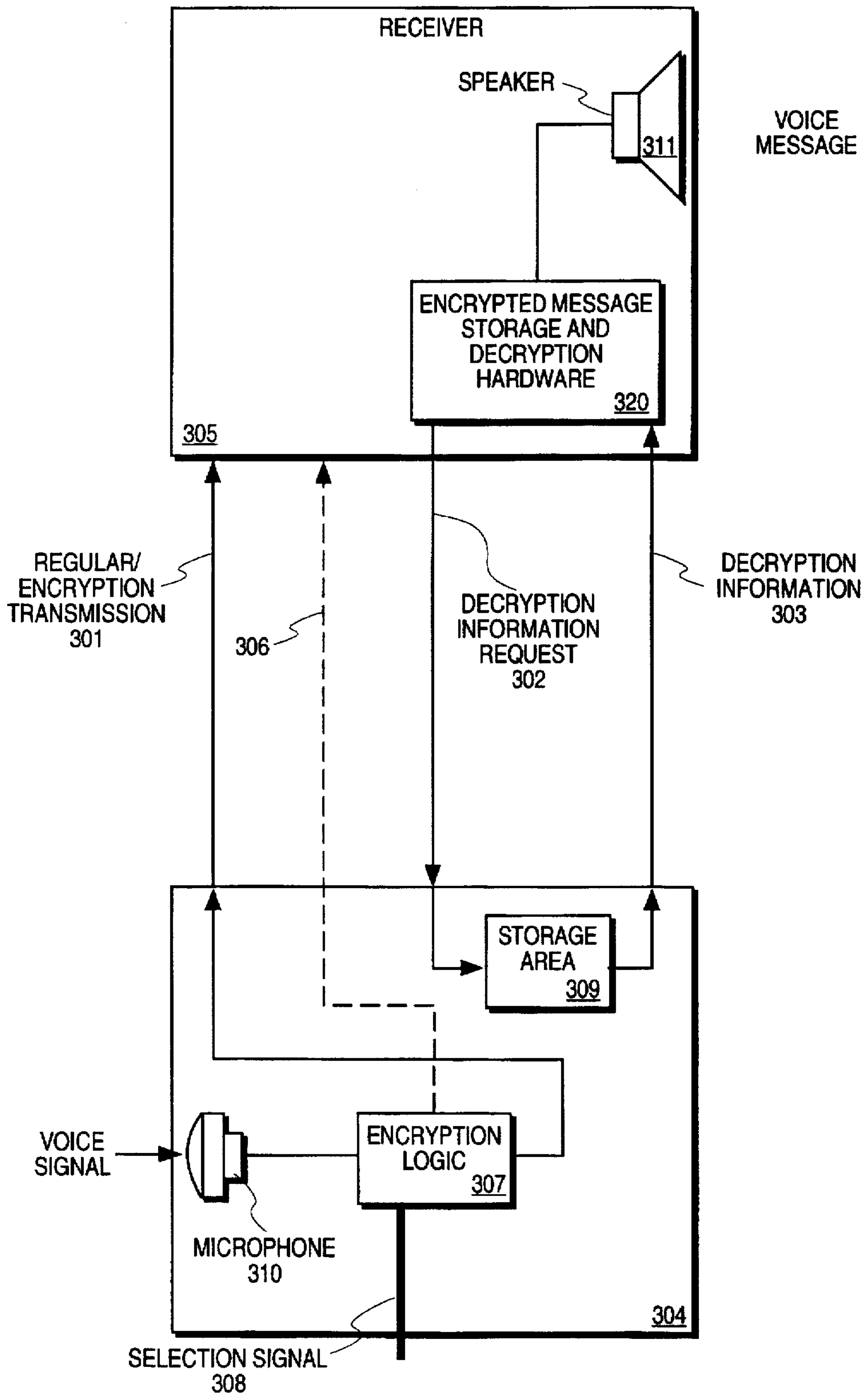
FIG. 3 is a block diagram of a sender and receiver pair in a telephone voicemail system.

FIG. 3 illustrates a sender-receiver pair in a telephone system according to the present invention. The sender and receiver are coupled by a transmission line 301, a decryption information request line 302 and decryption information 303. Note that each of these may represent one or more conductors. Transmission line 301 transfers both voice signals and encrypted transmissions between sender 304 and receiver 305. The decryption information request 302 comprises a certification request provided from the receiver 305 to sender 304, while decryption information line 303 transfers information to enable decryption.

Sender 304 sends voice or encrypted voice signals over line 301. At some time later, receiver 305 sends the decryption information request 302 to sender. In one embodiment, the decryption information request 302 comprise a key request. In response to the request 302, sender 304 sends information to enable decryption along line 303. In one embodiment, the decryption information may represent a key to enable receiver 305 to decrypt an encrypted message so that it may be heard by an individual. Another signal, such as signal 306, may be used to allow sender 304 to indicate to receiver 305 that the transmission is going to be encrypted. Note also that this may be done automatically as well.

The sender 304 generally comprises a microphone or other amplification mechanism to receive incoming voice signals and to send those signals to encryption logic 307. In response to a selection signal 308, encryption logic 307 either allows the voice signal to pass through unchanged to transmission line 301 or to be encrypted and sent to transmission line 301.

The selection signal 308 is set to cause the voice signal to be encrypted in response to an individual (or sender 304) determining that the message is to be recorded and pressing one or a sequence of buttons. Selection signal 308 may be set in response to automatic detection of recording of the message by receiver 305. That is, sender 304 may monitor the response by receiver 305 and determine when the message is to be recorded automatically, such as in response to a particular tone or sound sequence generated by receiver 305 prior to recording of a message. In such a case, encryption logic 307 would automatically encrypt the message.

Note that encryption logic 307 is also responsible for generating signal 306 to receiver 305 to indicate that this transmission is going to be an encrypted message.

Sender 304 also includes storage area 309 which stores the information necessary for decrypting messages which it sends. In one embodiment, the storage area 309 stores keys that are used for decryption. Storage area 309 further includes logic responsive to a decryption information request 302 (i.e., the certification request) from receiver 305 for causing the broadcasting of the decryption information over line 303. In one embodiment, the additional storage area logic includes a key transmission mechanism to send a key over line 303. Note that storage area 309 may also store message identification information with the decryption information to allow identification of the proper decryption information to be sent.

In one embodiment, receiver 305 comprises storage and decryption hardware 320 for storing received encrypted messages. The encrypted message storage may be part of a general storage area for all messages or may be in memory area separate than the memory area used for non-encrypted voice messages.

Where a single storage is used, one or more bits may be used to provide an indication of whether the message stored in a particular location is encrypted or not. The message storage for the encrypted message may further include a phone number indicating the source of the encrypted message or may indicate a third party location, either of which may be used to obtain the information necessary to decrypt the message. Note that this additional information requires no significant increase in memory.

When an individual desires to access their stored messages, they typically press one or more buttons or their machine. If the message being retrieved is encrypted, the decryption hardware 320 generates the decryption request 302 as a certification request to sender 304. In response, receiver 305 obtains the necessary decryption information.

Decryption hardware 320 decrypts the message using the decryption information received on line 303. As the message is being decrypted, an individual hears the message through speaker 311 in an audible/understandable form.

Note that although the sender and receiver are shown here having distinct circuitry, each may be a transceiver in the system capable of transmitting and receiving encrypted voice messages. In such a case, atransceiver would contain the hardware contained in both sender 304 and receiver 305. It should be noted that the above hardware and functionality may be implemented using standard technology.

Whereas, many alterations and modifications of the present invention will no doubt become apparent to a person of ordinary skill in the art after having read the foregoing description, it is to be understood that the particular embodiment shown and described by way of illustration are in no way to be considered limiting. Therefore, reference to the details of the various embodiments are not intended to limit the scope of the claims which themselves recite only those features regarded as essential to the invention.

Thus, a method and apparatus for sending certifiable telephone messages has been described.

I claim:

1. A method for communicating comprising the steps of:

receiving an encrypted version of a voice signal at a first location;

sending a certification request to a second location to obtain information to enable decryption of the encrypted version of the voice signal;

receiving the information to enable decryption, the information being received in response to sending the certification request; and decrypting the encrypted version of the voice signal.

2. The method defined in claim 1 further comprising the step of receiving a notification from the second location that the voice signal as transmitted is encrypted.

3. The method defined in claim 1 further comprising the steps of:

dialing the second location; and determining that the voice signal is going to be recorded, wherein the encrypted version of the voice signal is sent if determined that the voice signal is to be recorded.

4. The method defined in claim 1 further comprising the step of indicating that the voice signal is to be recorded prior to receiving the encrypted version of the voice signal.

5. The method defined in claim 1 wherein the request comprises a signal.

6. The method defined in claim 1 wherein the request is transferred on a telephone line.

7. The method defined in claim 1 wherein said information comprises a decryption key.

8. A method defined in claim 7 wherein the key is unique to the voice signal.

9. The method defined in claim 7 wherein the key is unique to a sender of the voice signal.

10. The method defined in claim 1 wherein the second location comprises a location from which the encrypted version of the voice signal was sent.

11. The method defined in claim 1 wherein the second location comprises a location other than that location from which the encrypted version of the voice signal was sent.

12. The method defined in claim 1 further comprising the step of storing the encrypted version of the voice signal.

13. The method defined in claim 1 wherein the information to enable decryption comprises a key.

14. The method defined in claim 1 wherein the step of sending the certification request comprises the step of entering a code.

15. The method defined in claim 1 wherein the step of sending the certification request comprises pressing at least one button.

16. A method of transferring a voice message comprising the steps of:

sending an encrypted version of the voice message to a first location, wherein the step of sending comprises encrypting the voice message as the voice message is being spoken;

storing the encrypted version of the voice message; and retrieving the voice message, wherein the step of retrieving comprises the steps of sending a request for decryption information along the telephone lines, receiving the decryption information from a second location to enable decryption in response to the certification request, and decrypting the encrypted version of the voice message using the decryption information.

17. The method defined in claim 16 further comprising the steps of:

dialing the first location; and determining that the voice message is going to be recorded, wherein the encrypted version of the voice message is sent if determined that the voice message is to be recorded.

18. The method defined in claim 16 wherein the request comprises a signal.

19. The method defined in claim 16 further comprising the step of transmitting a key to the first location.

20. The method defined in claim 19 wherein the key is transmitted from a location from which the encrypted version of the voice message was sent.

21. The method defined in claim 19 wherein the key is transmitted from a location other than that location from which the encrypted version of the voice message was sent.

22. The method defined in claim 16 further comprising the step of notifying the first location that the voice message is being transmitted in an encrypted format.

23. The method defined in claim 16 wherein the decryption information comprises a key.

24. The method defined in claim 16 wherein the step of sending a request comprises the step of entering a code.

25. The method defined in claim 16 wherein the step of sending a request comprises the step of pressing at least one button.

26. An apparatus for sending and receiving voice signals, said transceiver comprising:

a microphone to receive a voice signal;

an encryption unit coupled to the microphone to generate an encryption version of the voice signal in response to the voice signal;

a telephone transmitter coupled to the encryption unit to transmit the encrypted version of the voice signal to a first location over a first of a plurality of telephone lines and to transmit first decryption information over a second of the plurality of telephone lines in response to a request from the first location.

27. The apparatus defined in claim 26 further comprising a memory that contains the decryption information.

28. The apparatus defined in claim 26 further comprising:

a telephone receiver that receives messages;

a memory coupled to the telephone receiver that stores messages received by the telephone receiver from a plurality of locations;

a decryption unit coupled to the memory to decrypt encrypted messages stored therein, wherein the decryption unit generates a request to a source of an encrypted message to obtain second decryption information to decrypt encrypted messages using the second decryption information received; and a speaker coupled to the decryption unit to play decrypted messages.

29. The method defined in claim 28 wherein the decryption unit generates a request and response to entry of a code.

30. The method defined in claim 28 wherein the decryption unit generates a request in response to pressing at least one button.

31. The method defined in claim 26 where the first decryption information comprises a key.

* * * * *